(12) United States Patent
Hecker et al.

(10) Patent No.: US 10,399,550 B2
(45) Date of Patent: Sep. 3, 2019

(54) METHOD FOR CONTROLLING A MOTOR VEHICLE SERVICE BRAKE DEVICE AND SERVICE BRAKE VALVE DEVICE FOR SAID TYPE OF SERVICE BRAKE DEVICE

(71) Applicant: KNORR-BREMSE Systeme fuer Nutzfahrzeuge GmbH, Munich (DE)

(72) Inventors: Falk Hecker, Markgroeningen (DE); Friedbert Roether, Cleebronn (DE); Thilo Schmauider, Tamm (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/439,184

(22) Filed: Feb. 22, 2017

(65) Prior Publication Data

US 2017/0158183 A1   Jun. 8, 2017

Related U.S. Application Data

(63) Continuation of application No. PCT/EP2015/066093, filed on Jul. 15, 2015.

(30) Foreign Application Priority Data

Aug. 22, 2014   (DE) .................. 10 2014 112 014

(51) Int. Cl.
*B60T 8/34* (2006.01)
*B60T 13/26* (2006.01)
*B60T 15/04* (2006.01)

(52) U.S. Cl.
CPC ............ *B60T 15/043* (2013.01); *B60T 8/342* (2013.01); *B60T 13/261* (2013.01); *B60T 15/041* (2013.01)

(58) Field of Classification Search
CPC ....... F16J 15/3208; B60T 8/323; B60T 8/327; B60T 8/1708; B60T 8/342; B60T 13/261;
(Continued)

(56) References Cited

U.S. PATENT DOCUMENTS

| 5,395,164 A * | 3/1995 | Sulzyc | B60T 7/042 |
| | | | 188/151 A |
| 6,053,205 A * | 4/2000 | Feldmann | B60T 7/06 |
| | | | 137/627.5 |

(Continued)

FOREIGN PATENT DOCUMENTS

| CN | 103079919 A | 5/2013 |
| CN | 103492247 A | 1/2014 |

(Continued)

OTHER PUBLICATIONS

English machined translation of DE-19653264, Jun. 1998.*

(Continued)

*Primary Examiner* — Robert A. Siconolfi
*Assistant Examiner* — San M Aung
(74) *Attorney, Agent, or Firm* — Crowell & Moring LLP

(57) ABSTRACT

A method for controlling a pneumatic or electro-pneumatic service brake device of a vehicle is provided. In the method a driver brake request occurs by actuating a service brake actuating element of a service brake valve device of the braking device. In response to actuating the service brake actuating element, at least one control piston of the service brake valve device is loaded with a first actuating force in order to generate a pneumatic brake pressure or brake control pressure in at least one pneumatic service brake circuit of the service brake device. The control piston directly or indirectly controls at least one double-seat valve of the service brake valve device. The at least one double-seat valve includes an inlet seat and an outlet seat. The at (Continued)

least one control piston of the service brake valve device in addition is loaded by a second actuation force additionally or instead of the first actuation force. The second actuation force, which is generated independently of a driver braking request, is applied to the at least one control piston in parallel to the first actuation force, either in the same direction or in the counter direction.

17 Claims, 9 Drawing Sheets

(58) Field of Classification Search
CPC .......... B60T 13/38; B60T 13/66; B60T 13/68; B60T 13/683; B60T 13/662; B60T 13/385; B60T 13/263; B60T 15/027; B60T 15/14; B60T 15/043; B60T 15/041; B60T 17/18
USPC .............................................. 303/127, 123, 3
See application file for complete search history.

(56) References Cited

U.S. PATENT DOCUMENTS

| | | | |
|---|---|---|---|
| 6,354,671 B1 * | 3/2002 | Feldmann | B60T 7/042 303/15 |
| 6,644,758 B1 | 11/2003 | Stumpe | |
| 6,659,244 B2 | 12/2003 | Goodell | |
| 2002/0066628 A1 | 6/2002 | Goodell | |
| 2005/0218719 A1 | 10/2005 | Hatipoglu et al. | |
| 2006/0076823 A1 * | 4/2006 | Soupal | B60T 13/263 303/7 |
| 2006/0261670 A1 | 11/2006 | Hatipoglu et al. | |
| 2007/0296267 A1 * | 12/2007 | Walker | B60T 13/265 303/15 |
| 2013/0162013 A1 | 6/2013 | Drumm | |
| 2013/0320751 A1 * | 12/2013 | Eberling | B60T 7/042 303/14 |
| 2014/0110997 A1 | 4/2014 | Biller et al. | |
| 2014/0152085 A1 | 6/2014 | Biller et al. | |

FOREIGN PATENT DOCUMENTS

| | | |
|---|---|---|
| DE | 34 13 759 A1 | 10/1985 |
| DE | 42 32 492 A1 | 3/1994 |
| DE | 196 53 264 A1 | 6/1998 |
| DE | 19852399 A1 | 5/2000 |
| DE | 199 23 455 A1 | 7/2000 |
| DE | 10 2010 040 078 A1 | 3/2012 |
| DE | 02010051812 * | 4/2012 |
| DE | 102010051812 * | 4/2012 |
| DE | 10 2012 205 962 A1 | 11/2012 |
| EP | 0 160 750 B1 | 3/1989 |
| EP | 0 590 515 B1 | 12/1995 |
| WO | WO 2009/152981 A1 | 12/2009 |

OTHER PUBLICATIONS

International Search Report (PCT/ISA/210) issued in PCT Application No. PCT/EP2015/066093 dated Feb. 9, 2016 with English translation (five pages).

German-language Written Opinion (PCT/ISA/237) issued in PCT Application No. PCT/EP2015/066093 dated Feb. 9, 2016 with English translation (11 pages).

International Preliminary Report on Patentability (PCT/IB/ 326, PCT/IB/338, & PCT/IB/373) issued in PCT Application No. PCT/EP2015/066093 dated Mar. 9, 2017 (9 pages).

Chinese-language Office Action issued in counterpart Chinese Application No. 201580045163.4 dated Sep. 26, 2018 with English translation (20 pages).

Notice of Objection issued in counterpart European Application No. 15739554.2 dated Jan. 31, 2019 (41 pages).

Fahrwerk, "Kraftfahr-technisches Taschenbuch", Bosch Technik fuers Leben, 2014, pp. 938-955, Springer Vieweg (13 pages).

"Bendix E-8P & E-10P Dual Brake Valves", Bendix Service Data SD-03-830, 2007, pp. 1-8, Bendix Commercial Vehicle Systems LLC. (eight (8) pages).

"Bendix E-6 & E-10 Dual Brake Valves", Bendix Service Data SD-03-817, 2007, pp. 1-8, Bendix Commercial Vehicle Systems LLC. (eight (8) pages).

"EBS Electronically Controlled Brake System in Motor Coaches", Wabco, 2003, pp. 1-32 (32 pages).

* cited by examiner

METHOD FOR CONTROLLING A MOTOR VEHICLE SERVICE BRAKE DEVICE AND SERVICE BRAKE VALVE DEVICE FOR SAID TYPE OF SERVICE BRAKE DEVICE

CROSS REFERENCE TO RELATED APPLICATIONS

This application is a continuation of PCT International Application No. PCT/EP2015/066093, filed Jul. 15, 2015, which claims priority under 35 U.S.C. § 119 from German Patent Application No. 10 2014 112 014.0, filed Aug. 22, 2014, the entire disclosures of which are herein expressly incorporated by reference.

BACKGROUND AND SUMMARY OF THE INVENTION

The invention relates to a method for controlling a pneumatic or electropneumatic service brake device of a vehicle. In the method a driver braking demand is imparted through actuation of a service brake actuation element of a service brake valve device of the brake device. As a result of actuation of the brake actuation element, at least one control piston of the service brake valve device is subjected to load with a first actuation force and the control piston directly or indirectly controls at least one double-seat valve, which comprises an inlet seat and an outlet seat, in order to generate a pneumatic brake pressure or brake control pressure in at least one pneumatic service brake circuit of the service brake device.

The invention also relates to a service brake valve device for a pneumatic or electropneumatic vehicle service brake device, having a service brake actuation element which is actuable by a driver in a manner dependent on a driver braking demand. In a manner dependent on an actuation of the service brake actuation element, a pneumatic brake pressure or brake control pressure is input into at least one port for a pneumatic service brake circuit such that a first actuation force is applied to the at least one control piston. At least one double-seat valve which is controlled directly or indirectly by the at least one control piston and which comprises an inlet seat, which is connected to a port for a compressed-air supply, and an outlet seat, which is connected to a pressure sink, in a manner dependent on the control connects the at least one port for the pneumatic service brake circuit either to the port for the compressed-air supply or to the pressure sink.

Such a service brake valve device which is for example of single-circuit configuration, that is to say which controls one pneumatic brake circuit, is known from German patent document no. DE 42 32 492 A1.

Also known from the prior art are service brake valve devices with two pneumatic circuits, for example a front-axle brake circuit and a pneumatic rear-axle brake circuit. Furthermore, a service brake valve device of said type, which is then electropneumatic or footbrake module may also be supplemented by a purely electrical circuit which controls a primary electropneumatic brake circuit, wherein then, the two pneumatic brake circuits are used merely redundantly. Purely pneumatic service brake valve devices are accordingly for purely pneumatic service brake devices, and electropneumatic service brake valve devices or footbrake modules are for electropneumatic service brake devices or for EBS (electronically regulated brake systems).

All of these service brake valve devices from the prior art have in common the fact that, in their pneumatic ducts to which in each case one pneumatic service brake circuit is connected, they generate merely a brake pressure or brake control pressure which is dependent on an actuation of the brake actuation element, for example of a footbrake pedal.

On the other hand, driver assistance systems such as drive slip regulation systems (ASR), emergency braking assistants (AEBS), adaptive cruise control systems (ACC) or driving dynamics regulation systems (ESP) which vary, modulate or shut off with the aid of which the brake pressure or brake control pressure output by the service brake valve to the wheel brake cylinders, have, in part, existed for some time. In the case of ASR, for example, by way of ASR valves connected into the brake pressure lines between the corresponding duct of the service brake valve and the respective brake cylinders at driven axles, either the brake pressure output by the respective duct of the service brake valve device is input into the respective wheel brake cylinder, or else compressed air is supplied at a certain supply pressure from a compressed air storage vessel in the event of excessive drive slip.

Manipulation or variation of the brake pressure or brake control pressure in a manner dependent on driving operation conditions and secondary to the service brake valve device therefore firstly requires a certain outlay.

Secondly, a disadvantage of conventional ASR systems is that the brake pressure can be only controlled and not regulated by way of ABS pressure control valves, and said brake pressure can thus correspond to a setpoint pressure only to a limited extent. Also, different brake pressures can be set on the right-hand side and on the left-hand side of the vehicle, which may be noticeable in particular in the event of light braking interventions such as are often necessary for example in the case of an adaptive cruise control system (ACC).

OBJECT OF THE INVENTION

Taking this as a starting point, it is an object of the invention to further develop a service brake valve device and a method for controlling a pneumatic or electropneumatic service brake device such that the brake pressure or brake control pressure generated in the service brake valve device can be generated or varied in a manner independent of a driver, that is to say without action on the part of the driver, in as simple a manner as possible.

The background to this object is the fact that electronic driver assistance systems such as drive slip regulation systems (ASR), driving dynamics regulation systems (ESP), adaptive cruise control systems (ACC) or emergency braking assistants (AEBS), which assist the driver by way of active braking interventions in a manner dependent on driving operating conditions or driving situations, are becoming ever more widely used.

DISCLOSURE OF THE INVENTION

In the case of the method for controlling a pneumatic or electropneumatic service brake device of a vehicle, it is proposed according to the invention that the at least one control piston of the service brake valve device is subjected to load with not only the first actuation force but additionally with a second actuation force or with a second actuation force instead of the first actuation force, which second actuation force acts on the at least one control piston in parallel and in the same direction or in the opposite direction in relation to the first actuation force and is generated independently of a driver braking demand.

In the case of the service brake valve device, according to the invention that a second actuation force independent of a driver braking demand is provided, such that the second actuation force acts on the at least one control piston in parallel and in the same direction or in the opposite direction in relation to the first actuation force, and that an interface is provided by way of which signals formed in a manner dependent on driving operation conditions are used in generating the second actuation force.

In other words, the control piston of the service brake valve device is acted on in parallel by the first actuation force, which is dependent on a driver braking demand, and/or by the second actuation force, which is generated automatically and without action on the part of the driver, for example on the basis of signals from a driver assistance system. It is consequently possible for either both actuation forces (first and second actuation force) together or else each actuation force individually, in the absence of the respective other actuation force, to actuate the control piston and thus also the double-seat valve of the service brake valve. Here, it is possible for the two actuation forces to act on the control piston in the same direction, that is to say codirectionally, and in opposite directions, that is to say counterdirectionally. This yields numerous possibilities for the control of the brake pressure or brake control pressure, which is output centrally by the service brake valve device, for the service brake circuits.

The first actuation force, which is generated in a manner dependent on a driver braking demand, acts on the at least one control piston always in the same direction, specifically, owing to the actuation direction of the brake actuation element, in the direction for opening the outlet seat of the double-seat valve for the purposes of venting the at least one service brake circuit, such that the expressions "in the same direction" and "in the opposite direction" are clearly defined in relation to the direction of action of the first actuation force. Here, it is clear that in the absence of a first actuation force owing to a lack of a driver braking demand, the direction of action thereof on the at least one control piston is merely imaginary, in order to be able to specify a reference for the direction of action, which is then parallel thereto, of the second actuation force.

The advantages that can be achieved with a method of said type and with a service brake device of said type lie basically in the fact that a purely pneumatic service brake valve device or the pneumatic part of an electropneumatic service brake valve device or footbrake module (at least one pneumatic channel and one electrical channel) can automatically generate brake pressures or brake control pressures for service brake circuits in a manner independent of a driver braking demand and dependent on driving operation conditions. It is thus possible, in particular in a manner dependent on signals generated by driver assistance systems, for corresponding brake pressures to be generated in the service brake valve device, that is to say at a central location and for all service brake circuits connected to the service brake valve device, without action or influence on the part of the driver. Then, in the case of automatic (external) actuation by way of a driver assistance system, a service brake device equipped with a service brake valve device of said type reacts in the same way as in the event of a driver braking demand, for example with regard to the brake force distribution or the control of the trailer brakes.

In particular, to realize drive slip regulation (ASR), ASR valves are no longer necessary, because, in the event of inadmissibly high levels of drive slip at a driven axle (driving operation condition), by virtue of a second actuation force being automatically generated which then acts on the control piston in the same direction as a first actuation force generated by way of a possible driver braking demand, whereby the inlet valve seat of the double-seat valve is opened and the brake circuit of the axle that exhibits drive slip is vented, the brakes on both sides of the vehicle on the axle which exhibits drive slip can be applied. For an ABS function that is nowadays common in any case, ABS pressure control valves are provided which are connected into the brake pressure lines between the corresponding duct of the service brake valve device and the respective wheel brake cylinders, by way of which ABS pressure control valves the brake pressure or brake control pressure can be intermittently maintained or reduced.

In the event of different levels of drive slip between the different sides of the vehicle at the axle which exhibits drive slip, it is then possible for the respective brake pressure to be individually maintained or reduced by way of the respective ABS pressure control valve.

Thus, to retrofit a vehicle which has only ABS valves, but no ASR valves, with an ASR function, the pneumatic piping on the vehicle does not need to be modified.

In the case of simple braking demands, such as are automatically generated for example by adaptive cruise control systems (ACC), it is then no longer necessary for the ABS valves to be used for the pressure control, because the pressure control takes place already in the service brake valve device. Consequently, the ABS valves are subject to reduced wear.

The invention is also advantageous with regard to vehicles which are equipped with an emergency braking assistant (AEBS, Advanced Emergency Braking System), in the case of which the distance and the relative speed with respect to vehicles travelling in front are detected and, in the event of a risk of collision, the service brakes are automatically applied. In this case, the brake pressure for all wheel brakes can be increased very quickly centrally at the service brake valve device through generation of a corresponding second actuation force.

The invention is particularly advantageously also used in vehicles which have a permanent brake such as for example an engine brake, a hydrodynamic retarder, an electromagnetic retarder or an eddy-current brake. It is then possible, by virtue of a second actuation force, which acts in the opposite direction in relation to the first actuation force, being generated in a manner dependent on a degree of actuation or an action of the permanent brake, for the influence of the first actuation force on the control piston and thus the driver braking demand to be reduced. In other words, the driver braking demand is then at least partially implemented by way of the permanent brake in the context of brake blending, and thus the friction brakes, which are subject to wear, are preserved. A similar situation applies if the vehicle has a hybrid drive composed of internal combustion engine and electric motor, or else has only an electric drive, and a part of the braking power can be imparted by way of the generator braking action.

Altogether, therefore, the service brake valve device outputs only the brake pressure or the brake control pressure that is actually required at the wheel brakes. Wheel-specific pressure control is performed by way of the ABS pressure control valves which are arranged in the brake pressure lines which lead between the service brake valve device and the wheel brakes.

A further essential aspect of the invention is that the driver can override the braking demand imparted by the second actuation force at any time by actuating the brake actuation element of the service brake valve device, because then, in parallel with the second actuation force, the first actuation force which is based on the driver braking demand is applied to the at least one control piston, said first actuation force under some circumstances being greater than the second actuation force and also being directed counter to said second actuation force.

It is self-evident that, in the case of multiple pneumatic ducts of the service brake valve device, it is also possible for more than just a single control piston to be subjected to load by the second actuation force, or else only a single control piston, which then transmits the second actuation force to a further actuation piston.

The invention also relates to a vehicle having a pneumatic or electropneumatic service brake device which comprises at least one pneumatic service brake circuit and one above-described service brake valve device.

If a vehicle of said type has at least one driver assistance system, it is provided that the latter, via the interface of the service brake valve device, inputs control signals, which are dependent on driving operation conditions, into the electronic control device in order to generate the second actuation force for the at least one control piston in a manner dependent on driving operation conditions.

Driving operation conditions are to be understood to mean any conditions and parameters which can characterize the driving operation of a vehicle, including a (temporary) standstill state of the vehicle when it comes to a temporary stop or to a halt and when it is in the parked state.

The driver assistance system may be in particular one of the following driver assistance systems: a drive slip regulation system (ASR), an adaptive cruise control system (ACC), an emergency braking assistant (AEBS), a driving dynamics regulation system (ESP). This list is not exhaustive. It is consequently possible for signals of any driver assistance system to be used for the generation of the second actuation force.

The second actuation force may be generated pneumatically, hydraulically and/or electrically. The interface is therefore an interface for receiving electrical, pneumatic, hydraulic or mechanical signals. Here, embodiments are also conceivable in which the second actuation force is generated for example with the aid of an electromechanical or hydromechanical actuator and is then transmitted for example by way of a mechanism to the at least one control piston of the service brake valve device.

The second actuation force is however particularly preferably generated electropneumatically such that the conditions already prevailing at the service brake valve device are utilized to best possible effect. In particular, the second actuation force is generated pneumatically by way of an electropneumatic solenoid valve device, which is controlled by an electronic control device, by virtue of a control pressure acting directly or indirectly on the at least one control piston, which is output by the electropneumatic solenoid valve device in response to a signal of the electronic control device. Said control pressure then generates the second actuation force on the at least one control piston.

The control pressure output by the at least one solenoid valve device is preferably measured by way of a sensor arrangement and regulated by alignment with a setpoint value in the electronic control device. Here, the sensor arrangement and the solenoid valve device together with the electronic control device form a control pressure regulator.

The pneumatic control pressure prevails in particular in at least one control chamber which is delimited by the at least one control piston and by at least one wall of the service brake valve device, wherein the control chamber is arranged in the service brake valve device such that, when vented, said control chamber imparts to the at least one control piston a second actuation force in the same direction or in the opposite direction in relation to the first actuation force. Said measures require only minor modifications to a service brake valve device according to the prior art.

The control pressure or the second actuation force is in particular automatically generated in a manner dependent on driving operation conditions. Signals which are dependent on the driving operation conditions and on the basis of which the second actuation force is then generated preferably originate from a driver assistance system, and are input into the electronic control device via the then electrical interface, as has already been discussed in detail above.

Particular advantages emerge if the second actuation force acting on the at least one control piston, an actuation travel of the at least one control piston of the service brake value device resulting from the second actuation force, and/or a variable which generates the second actuation force, for example the abovementioned pneumatic control pressure, is measured as an actual variable and is aligned with a setpoint variable in context of regulation. This is because, then, the second actuation force or variables related thereto are incorporated into a regulating circuit. It is thus possible to compensate disadvantages which arise from the fact that ABS pressure control valves can be used to perform only pressure control, but not pressure regulation. With the aid of the regulation, which is optional here, of the second actuation force or of one of the above variables related thereto, the accuracy of the brake pressure setting can be increased.

To realize a regulation function of said type, it is possible for sensors to be provided to measure as an actual variable the second actuation force acting on the at least one control piston, an actuation travel of the at least one control piston resulting from the second actuation force, and/or a variable which generates the second actuation force. It is also possible to provide regulation and positioning device(s), by way of which the actual variable is aligned with a setpoint variable in the context of regulation.

According to a further embodiment, a second actuation force which is directed counter to the first actuation force (the latter being dependent on a driver braking demand) acts on the at least one control piston is generated in a manner dependent on the degree of actuation and/or on the braking action of a permanent brake or of a generator brake of the vehicle. In particular, the generation of the second actuation force results in a greater second actuation force in response to a greater the degree of actuation and/or the braking action of the permanent brake. The advantages of this embodiment have already been described in detail above.

For the simplest possible realization of such functionality, a first control chamber may be arranged in relation to the at least one control piston such that venting of the first control chamber causes a second actuation force in the same direction as the first actuation force to be generated on the at least one control piston. Furthermore, a second control chamber may be arranged such that venting of the second control chamber causes a second actuation force in the opposite direction to the first actuation force to be generated on the at least one control piston, with the first control chamber being aerated or vented by way of a first solenoid valve device or by way of a first control pressure regulator, and the second control chamber being aerated or vented independently thereof by way of a second solenoid valve device or by way of a second control pressure regulator.

The at least one control piston may be a double piston with two pistons connected by a piston rod, of which a first piston delimits the first control chamber and a second piston delimits the second control chamber, wherein the first control chamber and the second control chamber adjoin mutually averted surfaces of an inner wall of the service brake valve device through which the piston rod extends in sealing fashion.

By way of the service brake valve device, a brake pressure or brake control pressure (influenced by regulation) is preferably generated for each service brake circuit on the basis of the second actuation force, and said brake pressure or brake control pressure is controlled on a wheel-specific basis by way of ABS valves arranged in brake pressure lines which lead between the service brake valve device and the wheel brakes.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
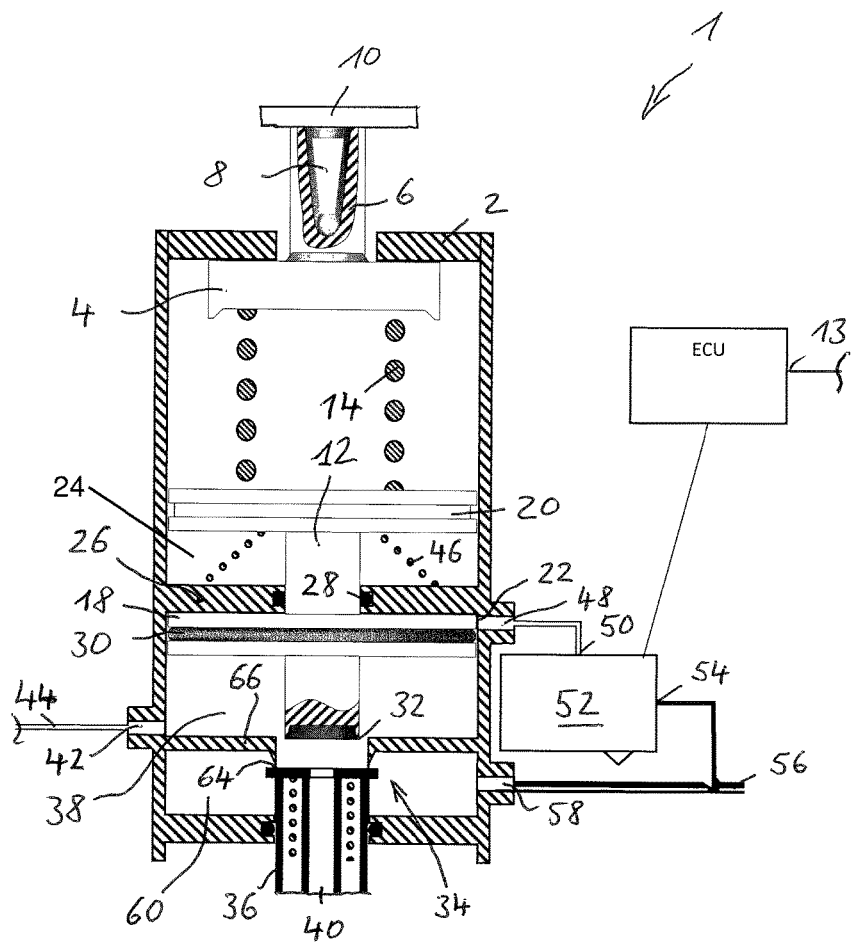
FIG. 1 shows a schematic cross sectional illustration of a service brake valve device of a pneumatic or electropneumatic service brake device of a vehicle in accordance with an embodiment of the invention, in a position "driving"

FIG. 1 shows a schematic cross-sectional illustration of a service brake valve device 1 of a pneumatic or electropneumatic service brake device of a vehicle, as per an embodiment of the invention, in a position "driving".

In the embodiment shown, the service brake valve device 1 has only one pneumatic service brake circuit or one pneumatic channel, though may also have further pneumatic service brake circuits or pneumatic channels. In addition to the pneumatic service brake circuit or the pneumatic channel, it is for example also possible for an electrical service brake circuit or an electrical channel with a travel or angle sensor for measuring an actuation of a service brake actuation element to be provided. In the latter case, in the then electropneumatic service brake valve device 1, reference may also be made to a so-called footbrake module, such as is used for example in electronically regulated brake systems (EBS) with brake pressure regulation. The footbrake module may be used firstly in two secondary pneumatic backup brake circuits to input in each case one pneumatic backup brake control pressure, and secondly in a primary electropneumatic brake circuit to input into an electronic brake control unit an electrical signal, which is dependent on a braking demand, and from there, possibly after correction by way of further signals, into subordinate pressure regulating modules which output a corresponding actual brake pressure to wheel brake cylinders in a manner dependent on said electrical signal which represents a brake pressure setpoint value. Pressure regulating modules of said type are well known and comprise, aside from a backup solenoid valve which retains the associated backup brake control pressure in the case of an intact electropneumatic brake circuit, an inlet-outlet solenoid valve combination, which is connected at an outlet side to a relay valve. A local electronic control unit and a pressure sensor for measuring the actual brake pressure output by the relay valve are additionally integrated in a pressure regulating module of said type. The actual brake pressure measured by the pressure sensor is then aligned, in the context of pressure regulation, with a setpoint brake pressure represented by the signal input by the electrical channel of the service brake valve device into the pressure regulating module.

Thus, the service brake valve device 1 described here is suitable for controlling at least the one or more pneumatic backup brake circuits of an electronically regulated brake system (EBS) of said type. Alternatively, the service brake valve device 1 may also be used in a purely pneumatic service brake device, or is comprised by such a purely pneumatic service brake device. Then, in such a case, no electrical channel is provided.

The service brake valve device 1 has a housing 2 in which a plunger piston 4 with a plunger receptacle 6 which projects through a cover opening of a housing cover is received in axially movable fashion. A plunger 8 projects into the plunger receptacle 6 from above, which plunger is connected to a service brake actuation element 10 in the form of a footbrake plate. Therefore, when the driver actuates the footbrake plate 10, the plunger 8 is forced into the plunger receptacle 6, and the plunger piston 4 is moved downward in FIG. 1 by the actuation force.

The plunger piston 4 transmits the actuation force to a control piston 12, which is likewise mounted in axially movable fashion in the housing 2, preferably via a plunger piston compression spring 14. The control piston 12 is preferably a double piston with two pistons which are connected by a piston rod 16 and of which a first piston 18 delimits a first control chamber 22 and a second piston 20 delimits a second control chamber 24. The first control chamber 22 and the second control chamber 24 adjoin opposite surfaces of an inner wall 26 of the housing 2, which in this case is arranged transversely with respect to the axial direction. The piston rod 16 extends through the inner wall in sealing fashion at a passage opening. For this purpose, a ring-shaped seal 28, for example, is provided in the passage opening. Likewise, at least one of the two pistons 18, 20 of the control piston 12 is, at its radially outer circumferential surface, sealed off by a suitable sliding seal 30 with respect to a radially inner circumferential surface of the housing 2 which serves as a piston sliding surface.

The piston rod 16 of the control piston 12 has at its end pointing away from the service brake actuation element 10 an outlet seat 32 of a double-seat valve 34 which seals against a cup-shaped and hollow valve body 36 mounted in axially movable fashion in the housing 2, or when lifted therefrom, opens up a flow cross section between a working chamber 38 and a head-side passage opening in the valve body 36, which passage opening leads to a ventilation port 40. This situation is illustrated in FIG. 1. The working chamber 38 is connected to a port 42 for a service brake circuit, to which there is connected a brake pressure line 44 which leads, via a brake pressure line connected an ABS pressure control valve which is controlled by an electronic control device ECU to pneumatic wheel brake cylinders of an axle. For reasons relating to scale, the ABS pressure control valve and the wheel brake cylinder are not shown here. For example, the second piston 18 of the control piston 12 is preloaded by a control piston compression spring 46 supported on the inner wall 26 and arranged in the second control chamber 24 into the position in which the outlet seat 32 is raised from the valve body 36 thereby the wheel brake cylinders to be ventilated. This position of the control piston 12 permitting corresponds to the position "driving" of the service brake valve device 1 as shown in FIG. 1.

In the embodiment of FIG. 1, the second control chamber 24 is under merely atmospheric pressure, wherein a connection (not shown here) exists to said atmospheric pressure in order that, during movements of the control piston 12, no compression-induced or expansion-induced forces are generated on the control piston 12 in the second control chamber 24.

On the other hand, the first control chamber 22 is connected to a port 48 to which an outlet port 50 of a first solenoid valve device 52 is connected. The inlet port 54 of the first solenoid valve device 52 is connected to a supply pressure line 56, which is connected to a compressed-air reservoir. Furthermore, on the service brake valve device 1, there is provided a supply port 58 to which the supply pressure line 56 is likewise connected, and which is connected to a supply chamber 60.

The valve body 36 is biased against an inlet seat 64 of the double-seat valve 34 forced, by a valve body compression spring 62 which is supported on the base of the housing 2 and on the interior of the valve body 36. The inlet seat 64 is formed on a radially inner edge of a central passage bore of a further inner wall 66 of the housing 2. In the state in which the valve body 36 is raised from the inlet seat 64 counter to the action of the valve body compression spring 62, a flow cross section between the supply port 58 or the supply chamber 60 and the working chamber 38 is opened up, which permits a flow of compressed air at supply pressure into the port 42 for the service brake circuit, that is to say into the brake pressure line, for the purposes of ventilating the wheel brake cylinders of the respective axle or of the respective brake circuit.

As already mentioned above, FIG. 1 shows the position "driving" of the service brake valve device 1, in which the outlet seat 32 is raised from the valve body 36 and the port 42 for the service brake circuit, and thus also the wheel brake cylinders thereof, are connected to the ventilation port 40. In this way, the active pneumatic wheel brake cylinders of said brake circuit are released.

Figures 9A, 9B, 9C:
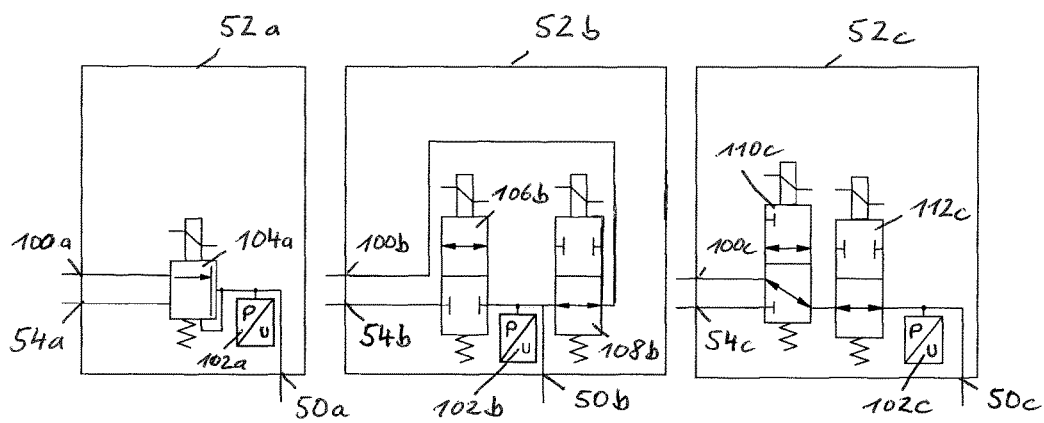
FIGS. 9A to 9C show embodiments of solenoid valve devices by way of which a pneumatic control pressure in accordance with the invention.

The first solenoid valve device 52, some embodiments of which are shown in FIG. 9*a* to FIG. 9*b*, permits aeration or ventilation of the first control chamber 22, and is controlled by the electronic control device ECU. The ECU in this case also controls, for example, the ABS pressure control valves in the context of brake slip regulation and in the context of yet further functions that will be described in more detail further below.

The electronic control device ECU, the first solenoid valve device 52 and the associated cabling or pneumatic piping or pneumatic lines, together with the components arranged in the housing 2, form the service brake valve device 1 preferably in the form of a structural unit. In such an embodiment the electronic control device ECU, the first solenoid valve device 52 and the associated cabling or pneumatic piping or pneumatic lines may be accommodated in a dedicated housing, which is for example flange-mounted onto the housing 2.

Figure 2:
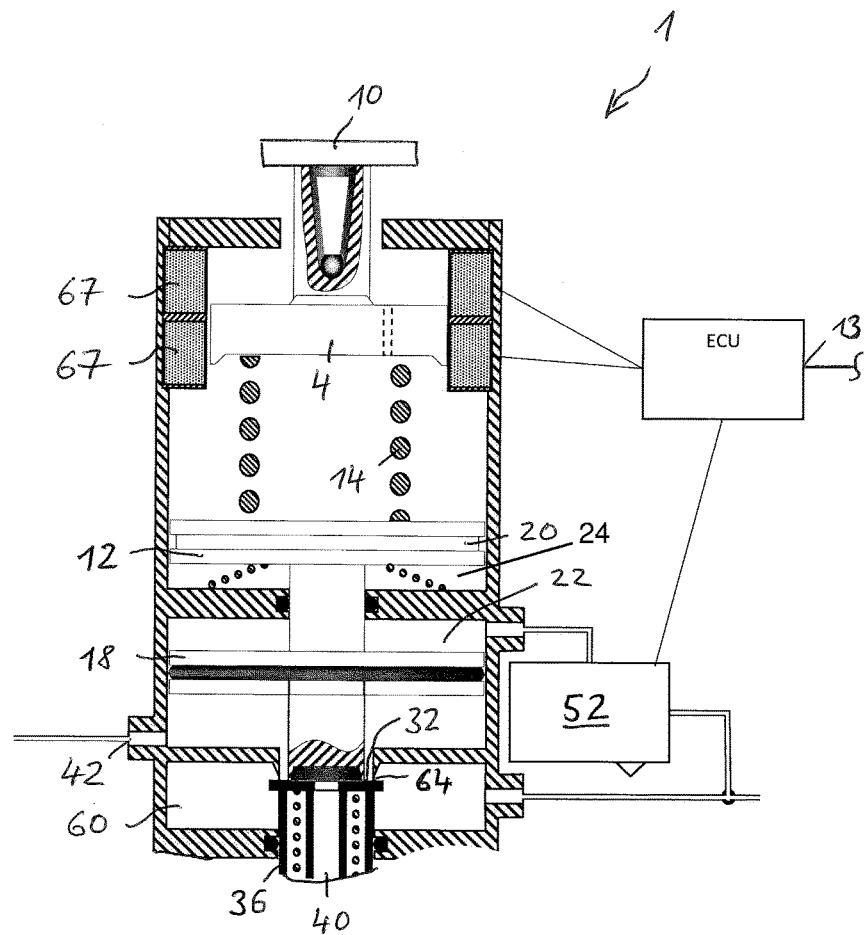
FIG. 2 shows the service brake valve device from FIG. 1 in a position "driver braking without automatic braking"

If, as per FIG. 2, the driver now actuates the service brake actuation element 10, which corresponds to a driver braking demand, the plunger piston 4 is displaced downward. The actuation force is transmitted via the plunger piston compression spring 14 to the control piston 12, which is likewise displaced downward until the outlet seat 32 seals against the valve body 36 and thus closes the connection between the port 42 for the service brake circuit and the ventilation port 40, such that no further ventilation of the associated wheel brake cylinders is possible.

In the event of more extensive actuation of the service brake actuation element 10 in response to the driver braking demand, the valve body 36 with outlet seat 32 bearing against it is forced downward, so as to lift off from the inlet seat 64. As a result, as described above, compressed air at supply pressure passes from the supply chamber 60 to the working chamber 38 and from there into the port 42 for the service brake circuit or into the associated wheel brake cylinders in order to aerate said wheel brake cylinders and thus impart a brake-application action therein. The situation in FIG. 2 is thus a situation with purely driver braking, in which, owing to the actuation force which is exerted by the driver on the service brake actuation element 10 in a manner dependent on the driver braking demand, a first actuation force is exerted on the control piston 12 via the plunger piston compression spring 44 which ultimately adjusts said control piston into its aeration position.

In the case of such a braking operation initiated purely by a driver braking demand, the first solenoid valve device 52 is controlled, by the electronic control device ECU into a ventilation position in which the first control chamber 22 is connected to the atmosphere, in order to avoid pressure effects that arise owing to the expansion of the first control chamber 22.

In FIG. 2, the embodiment of FIG. 1 is supplemented by two redundant travel sensors 67, in particular inductive travel sensors, which are preferably arranged axially in series and which are arranged in the axial region of the plunger piston 4 in order to measure the actuation travel thereof or the degree of actuation proportional to the actuation travel corresponding to the degree of actuation of the service brake actuation element 10. The signals from said travel sensors 67 are used for example in an electrical channel of the service brake valve device 1 and are input into the electronic control device ECU, which then transmits positioning signals, possibly corrected by way of further signals such as load signals, to pressure regulating modules of the front axle and of the rear axle, as has already been described above. In this respect, the service brake valve device of FIG. 2 can be used in an EBS system (electronically regulated brake system). The electronic control device ECU then simultaneously forms a brake control unit for the EBS.

As emerges from FIG. 1 to FIG. 6, the first control chamber 22 in the service brake valve device 1 is arranged in relation to the control piston 12 such that aeration of the first control chamber 22 causes a second actuation force to be generated on the control piston 12 in the same direction as the first actuation force initiated by a pure driver braking action. On the other hand, the second control chamber 24 is arranged in relation to the control piston 12 such that aeration of the second control chamber 12 causes a second actuation force to be generated on the control piston 12 in the opposite direction to the first actuation force. Ventilation of the control chamber 24 then leads to a reduction of the second actuation force down to, at a minimum, a value of zero.

Figure 3:
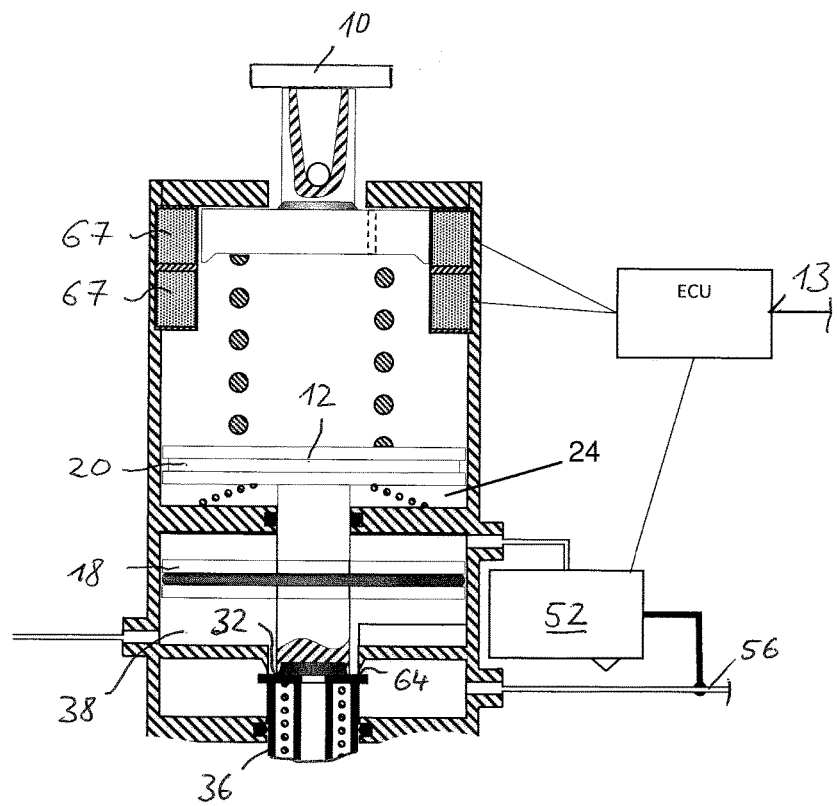
FIG. 3 shows the service brake valve device from FIG. 1 in a position "automatic braking without driver braking"

FIG. 3 shows the situation in which, in the absence of a driver braking demand, the first control chamber 22 is charged with a pneumatic control pressure which is output by the first solenoid valve device 52 when placed into the aeration position by the electronic control device ECU. The electronic control device ECU performs this preferably in response to signals which are based on driving operation conditions. Said signals particularly preferably originate from one or more driver assistance systems such as for example a drive slip regulation system (ASR), an adaptive cruise control system (ACC), an emergency braking assistant (AEBS) or a driving dynamics regulation system (ESP), and are input into the electronic control device ECU via an interface or an electrical terminal 13. Such driver assistance systems receive, from associated sensors, information and data relating to driving operation conditions such as vehicle speed, wheel rotational speeds, yaw rate, steer angle, loading, load distribution, wheel slip values etc., and in a manner dependent thereon, automatically generate positioning signals for various actuators, such as for example the brake device of the vehicle.

In other words, braking demand signals which represent an automatic braking demand are input into the electronic control device ECU, which braking demand signals are preferably generated in a manner dependent on driving operation conditions and originate from at least one driver assistance system. In response to said braking demand signals, the first solenoid valve device 52 is switched into an aeration position in order to input compressed air from the supply pressure line 56 as a pneumatic control pressure into the first control chamber 22.

In FIG. 3, it is then the case that a second actuation force resulting from the pneumatic control pressure acts on the first piston 18 of the control piston 12 from above, that is to say in the same direction and in parallel in relation to an imaginary first actuation force which would likewise act on the control piston 12 from above as a result of an actuation of the brake actuation element 10. Since it is however the case in FIG. 3 that no driver braking demand is present, said first actuation force is merely imaginary in order to predefine a reference for the direction of action of the second actuation force. Said second actuation force then forces the control piston 12 downward in FIG. 3, in order, firstly, to force the outlet seat 32 sealingly against the valve body 36 and in order, secondly, to raise the valve body 36 from the inlet seat 64, in order that compressed air can flow from the supply pressure line 56 into the working chamber 38 and can flow from there into the respective service brake circuit to apply the wheel brakes.

Depending on modulation of the pneumatic control pressure that is input into the first control chamber 22, it is then possible for a defined second actuation force to be set at the second control piston 12, which in turn results in a corresponding braking force, such that it is possible to set any desired braking force between the value of zero and a maximum braking force resulting from the supply pressure in the supply pressure line 56.

If the service brake valve device 1 is used in a pneumatic or electropneumatic brake device which has a drive slip regulation system (ASR), ASR valves are no longer required to realize this function, because, in the event of inadmissibly high levels of drive slip at a driven axle (driving operation condition), by the brake circuit of the axle which exhibits drive slip is aerated a second actuation force being automatically generated in the above-described manner. Since ABS pressure control valves are connected into the brake pressure lines between the duct of the service brake valve device of the axle which exhibits drive slip and the respective wheel brake cylinders, the brake pressure or brake control pressure can be intermittently maintained or reduced by the ABS pressure control valves. It is thus possible to realize an individual adaptation of the brake pressure on the right-hand side of the vehicle or left-hand side of the vehicle.

Figure 4:
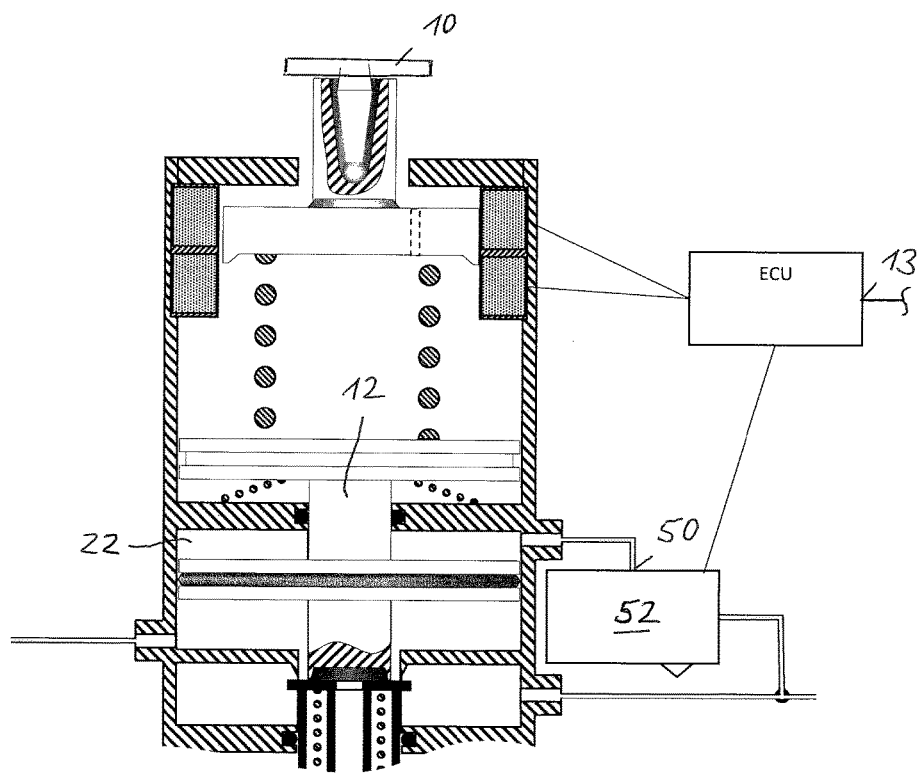
FIG. 4 shows the service brake valve device from FIG. 1 in a position "automatic braking and driver braking"

In FIG. 4, braking is performed in response to both a driver braking demand and an automatically generated braking demand. The control piston 12 is acted on in the same direction and in parallel by both the first actuation force from the driver braking demand and the second actuation force from the automatically generated braking demand, whereby the two actuation forces on the control piston 12 are added together.

The control pressure output by the first solenoid valve device 52 for the first control chamber 22 may be subjected to pressure regulation. In this case, the actual control pressure at the outlet port 50 is measured by a pressure sensor and is aligned with a predefined setpoint control pressure by the electronic control device ECU by corresponding actuation of the first solenoid valve device 52. The first solenoid valve device 52, together with the pressure sensor and the electronic control device ECU, forms a first pressure regulator for the control pressure in the first control chamber 22.

Figure 5:
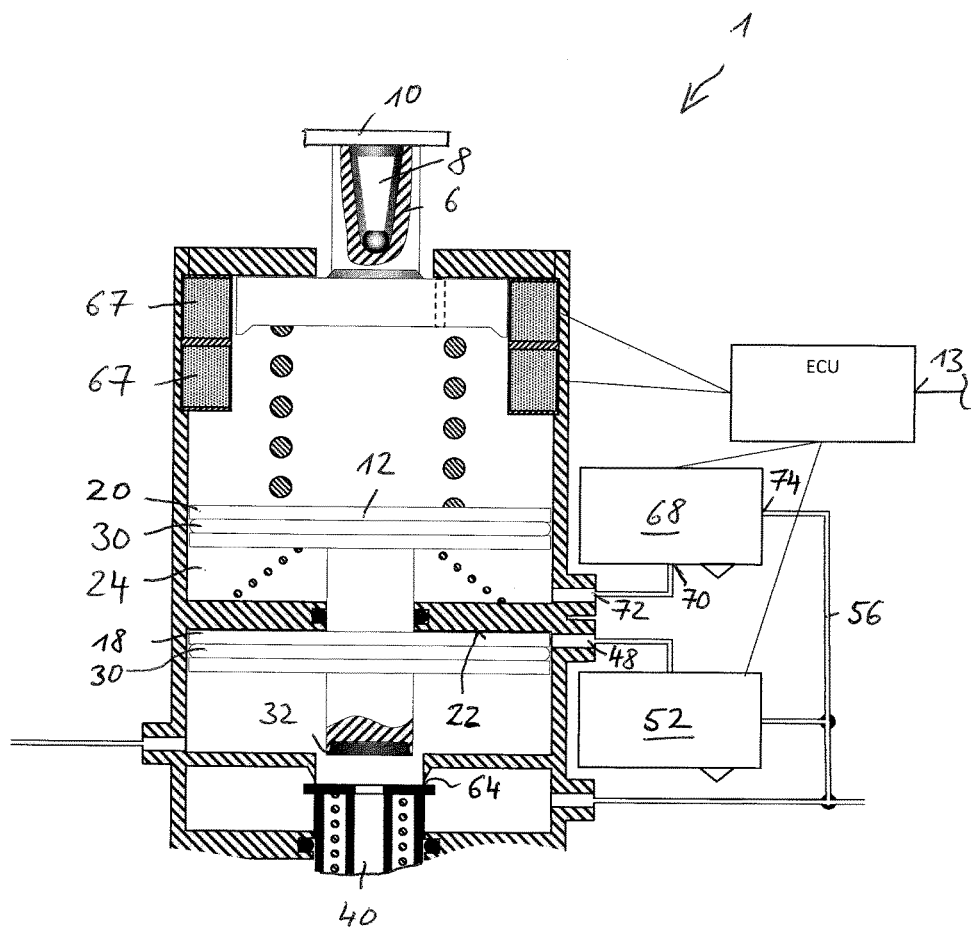
FIG. 5 shows a schematic cross-sectional illustration of a service brake valve device of a pneumatic or electropneumatic service brake device of a vehicle, in accordance with a further embodiment of the invention, in a position "retaining a driver braking action"

FIG. 5 shows a further embodiment, in which the second control chamber 24 can be aerated or ventilated by way of a dedicated second solenoid valve device 68. Said second solenoid valve device 68 is connected, by way of its outlet port 70 to a port 72, which leads into the second control chamber 24 of the service brake valve device 1. The second solenoid valve device 68 is likewise connected, by way of its inlet port 74, to the supply pressure line 56 and is in turn controlled by the electronic control device ECU. Examples of embodiments of a second solenoid valve device 68 of said type are shown in FIG. 9a to FIG. 9c. The second solenoid valve device 68 is preferably of identical construction to the first solenoid valve device 52. Furthermore, the second solenoid valve device 68, possibly together with an associated pressure sensor, likewise forms a constituent part of the service brake valve device 1.

Thus, with the aid of the second solenoid valve device 68 independent aeration or ventilation of the second control chamber 24 is possible independently of aeration or ventilation of the first control chamber 22 by the first solenoid valve device 52. To seal off the second control chamber, the second piston 20 likewise bears, for example, a sliding seal 30 on its radially outer circumferential surface.

It is thus possible in particular for a second actuation force to be exerted on the control piston 12 which continues to act in parallel, but in the opposite direction to the first actuation force. In this way, the action of a driver braking demand can be limited with regard to the brake pressure in the wheel brakes resulting from said driver braking demand. This embodiment is particularly suitable and advantageous for vehicles which have permanent brakes such as an engine brake or retarder and generator brakes, in the case of which, during braking, electrical energy is for example generated and in particular stored.

It is then possible to reduce the influence of the first actuation force on the control piston 12 and thus the driver braking demand, by virtue of a second actuation force that is generated in a manner dependent on a degree of actuation or an action of the permanent brake or the generator brake, in the direction opposite the first acuation force. In other words, the driver braking demand is then at least partially implemented by way of the permanent brake in the context of brake blending, and thus the friction brakes, which are subject to wear, are preserved. Altogether, therefore, the service brake valve device 1 then outputs only the brake pressure or the brake control pressure that is actually required at the wheel brakes as friction brakes.

With the embodiment shown in FIG. 5, it is therefore possible for the first control chamber 22 and the second control chamber 24 to be aerated or ventilated in each case independently of one another. This also encompasses a state in which both control chambers 22, 24 are aerated simultaneously, and thus oppositely acting second actuation forces are generated on the control piston 12, which is generally not demanded in practice. Furthermore, two solenoid valve devices 52, 68, for example as per FIG. 9a to FIG. 9c, are provided, with each of which regulation of the respectively output control pressure is realized.

Figure 6:
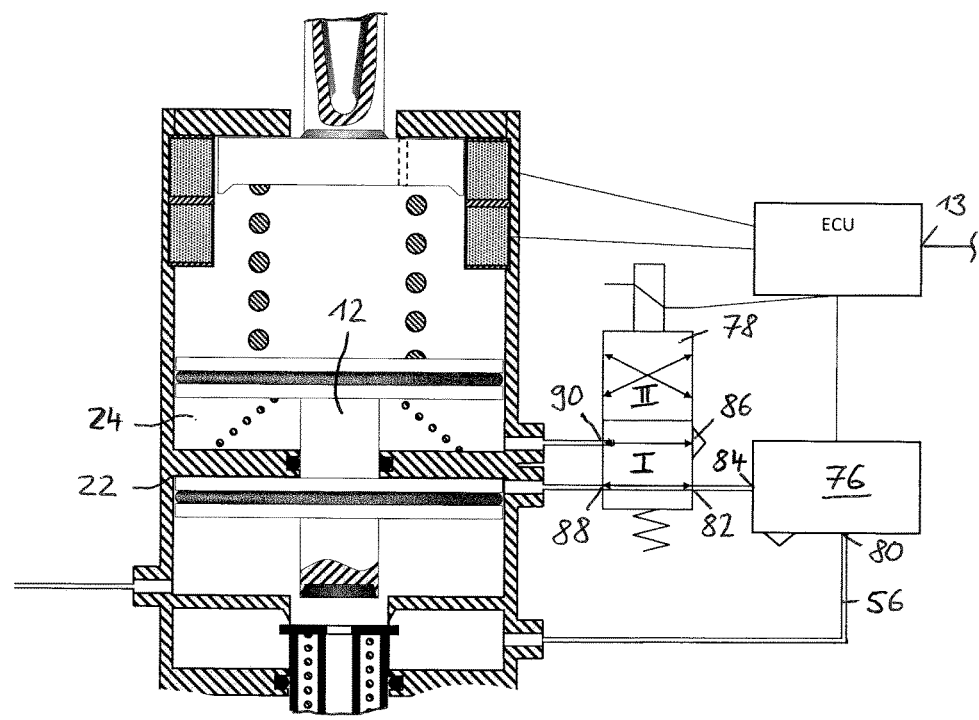
FIG. 6 shows a schematic cross-sectional illustration of a service brake valve device of a pneumatic or electropneumatic service brake device of a vehicle, in accordance with a further embodiment of the invention.

The difference of the embodiment of FIG. 6 in relation to FIG. 5 lies in the fact that, for the control of the pressures in the first control chamber 22 and in the second control chamber 24, a single solenoid valve device 76, as shown for example in FIG. 9a to FIG. 9c, and additionally a 4/2-way solenoid valve 78 are used. The solenoid valve device 76 is in turn connected by way of its inlet port 80 to the supply pressure line 56 and, like the 4/2-way solenoid valve 78, is controlled by the electronic control device ECU as described in the preceding embodiments.

The 4/2-way solenoid valve 78 has four ports and two switching positions I and II symbolized by the Roman numerals. A first port 82 is connected to the outlet port 84 of the solenoid valve device 76, a second port 86 is connected to a pressure sink (ventilation), a third port 88 is connected to the first control chamber 22, and a fourth port 90 is connected to the second control chamber 24. In its first switching position I shown in FIG. 6, 4/2-way solenoid valve 78 connects the first control chamber 22 at the third port 88 to the outlet port 84 of the solenoid valve device 76 at the first port 82. The first control chamber 22 is then charged with the control pressure output by said solenoid valve device 76 in order to generate a second actuation force for the control piston 12 in the same direction and parallel to a first actuation force which originates or would originate from a driver braking demand. In particular, the control pressure output by the solenoid valve device 76 is regulated. Furthermore, the second control chamber 24 connected to the fourth port 90 is connected to the pressure sink at the second port 86, in order that the downward movement of the control piston 12 is not impeded by compression in the second control chamber 24.

In the second switching position (not shown in FIG. 6) of the 4/2-way solenoid valve 78, the outlet port 84 of the solenoid valve device 76 at the first port 82 is connected to the second control chamber 24 at the fourth port 90, and the pressure sink at the second port 86 is connected to the first control chamber 22 at the third port 88. In this way, the control pressure output by the solenoid valve device 76 is input into the second control chamber 24 and the first control chamber 22 is ventilated, which results in a second actuation force on the control piston 12 in the opposite direction to a first actuation force based on a driver braking demand.

Thus, by way of control of the control pressure as per FIG. 6, it is likewise selectively possible to realize both cases, aeration or ventilation of the first control chamber 22 or aeration or ventilation of the second control chamber 24. By contrast, the situation of simultaneous aeration of both control chambers 22, 24, which is not demanded in practice, is ruled out. Furthermore, it is sufficient for only a single control pressure output by the solenoid valve device 76 to be regulated. The single control pressure output is then input selectively into the first control chamber 22 or into the second control chamber 24, depending on the switching position of the 4/2-way solenoid valve 78. Therefore, the embodiment of FIG. 6 likewise encompasses a pressure regulator with solenoid valve device 76, electronic control device ECU for actual value-setpoint value alignment and with a pressure sensor (not shown) for measuring the actual control pressure. Here, specification of the setpoint control pressure is realized in all cases in a manner dependent on driving operation conditions, and is initiated for example by a driver assistance system.

By contrast to the embodiments described above, it is the case in the embodiment of FIG. 7 that the first control chamber 22 does not adjoin the control piston 12 which directly actuates the double-seat valve 34. Rather, the first control chamber 22 is delimited by the housing 2 and the plunger piston 4, which, since it likewise, albeit indirectly, actuates or controls the double-seat valve 34, likewise constitutes a control piston of the service brake valve device 1. Here, the first control chamber 22 is arranged such that the aeration thereof gives rise to a second actuation force on the plunger piston 4, which is transmitted via the plunger piston compression spring 14 to the control piston 12 and from there to the double-seat valve 34. The function of the service brake valve device 1 is then realized as in the embodiments described above.

Figure 7:
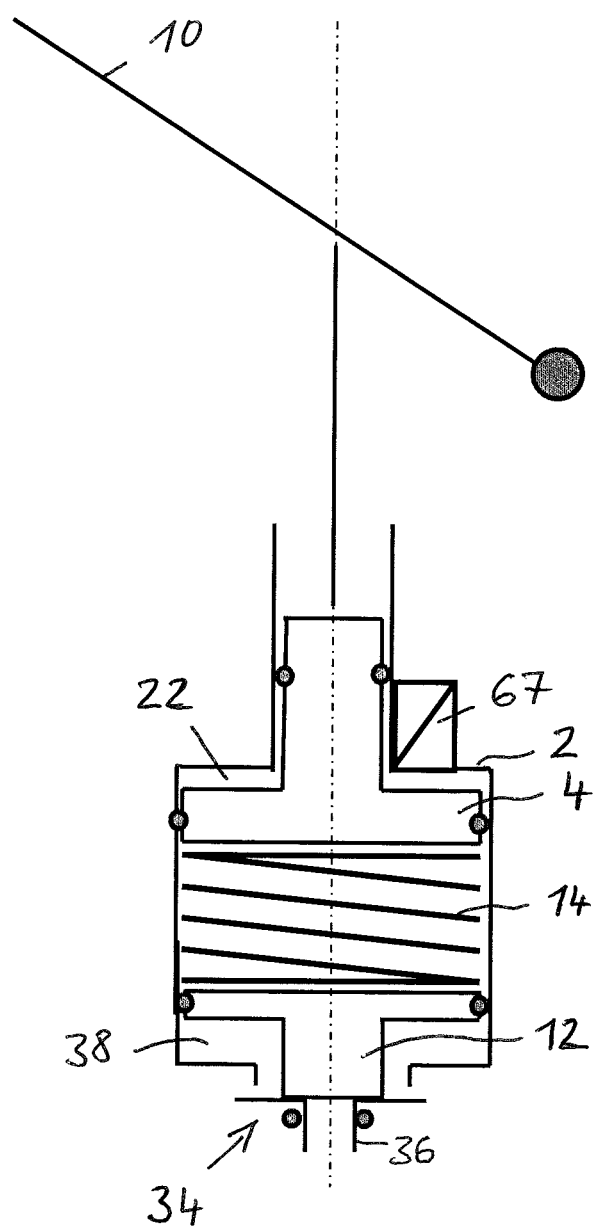
FIG. 7 shows a schematic cross sectional illustration of a service brake valve device of a pneumatic or electropneumatic service brake device of a vehicle, in accordance with a further embodiment of the invention.
Figure 8:
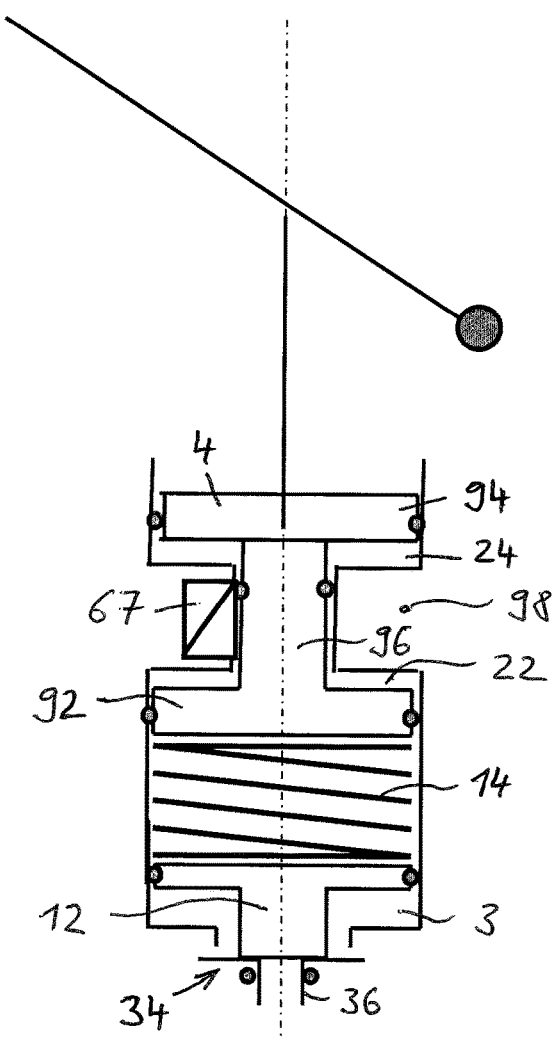
FIG. 8 shows a schematic cross sectional illustration of a service brake valve device of a pneumatic or electropneumatic service brake device of a vehicle, in accordance with a further embodiment of the invention.

FIG. 8 illustrates a refinement of the embodiment of FIG. 7, by virtue of the latter having been supplemented by a second control chamber 24, which is likewise formed between the housing 2 and the plunger piston 4. The plunger piston 4 is then designed for example as a double piston, similarly to the control piston as per FIG. 1, wherein a piston rod 96 which connects two pistons 92, 94 extends sealingly through an inner wall 98 of the housing 2, and the first control chamber 22 is formed between a first piston 92 and said inner wall 98 and the second control chamber 24 is formed between a second piston 94 and the inner wall 98. In this case, too, the plunger piston 4 in turn constitutes a control piston, which (indirectly) actuates the double-seat valve 34, and the function of the service brake valve device 1 is realized as in the embodiments described above.

FIGS. 9a to 9c now illustrate examples for solenoid valve devices 52a, 52b, 52c or control pressure regulators 52a, 52b, 52c, as are used in the preceding exemplary embodiments to control or regulate the pneumatic control pressure for the first control chamber 22 and/or the second control chamber 24. Here, for simplicity, only the reference designations used in FIG. 1 are shown.

These examples have in common the fact that they are controlled by the electronic control device ECU, have an inlet port 54a, 54b, 54c which is connected via the supply pressure line 56 to the compressed-air supply, and have an outlet port 50a, 50b, 50c, which is connected or placed in connection in each case with the first control chamber 22 or with the second control chamber 24. Furthermore, all embodiments have a vent 100a, 100b, 100c and a pressure sensor 102a, 102b, 102c for the measurement of the actual control pressure at the outlet port 50a, 50b, 50c, such that, in conjunction with corresponding algorithms in the electronic control device ECU, to which the actual control pressure signal prevailing at the outlet port 50a, 50b, 50c is transmitted, pressure regulation of the output control pressure is possible and/or is also performed.

In the embodiment of FIG. 9a, a proportional valve 104a ensures that a control pressure output correspondingly (proportionally) to the electrical control signal prevails at the outlet port 50a, wherein aeration and ventilation are likewise possible. In the embodiment of FIG. 9b, an inlet/outlet valve combination composed of two 2/2-way solenoid valves 106b, 108b is provided, wherein the inlet valve 106b which is directly connected to the inlet port 54b is closed when deenergized and open when energized, and the outlet valve 108b is open when deenergized and closed when energized. In FIG. 9c, as a solenoid valve device 52c, a 3/2-way solenoid valve 110c is used as an aeration and ventilation valve with an aeration position and a ventilation position in combination with a 2/2-way solenoid valve 112c as a maintaining valve, which in its blocking position maintains the pressure at the outlet port 50c.

A solenoid valve device 52a, 52b, 52c of said type may be used in each of the above-described embodiments in combination with the pressure sensor 102 as control pressure regulator, which includes the electronic control device ECU, for regulating the control pressure prevailing at the outlet 50a, 50b, 50c.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Service brake valve device
2 Housing
4 Plunger piston
6 Plunger receptacle
8 Plunger
10 Service brake actuation element
12 Control piston
13 Electrical terminal
14 Plunger piston compression spring
16 Piston rod
18 First piston
20 Second piston
22 First control chamber
24 Second control chamber
26 Inner wall
28 Ring-shaped seal
30 Sliding seals
32 Outlet seat
34 Double-seat valve
36 Valve body
38 Working chamber
40 Ventilation port
42 Service brake circuit port
44 Brake pressure line
46 Control piston compression spring
48 Port
50 Outlet port
52 First solenoid valve device
54 Inlet port
56 Supply pressure line
58 Supply port
60 Supply chamber
62 Valve body compression spring
64 Inlet seat
66 Inner wall
67 Travel sensor
68 Second solenoid valve device
70 Outlet port
72 Port
74 Inlet port
76 Solenoid valve device
78 4/2-way solenoid valve
80 Inlet port
82 First port
84 Outlet port
86 Second port
88 Third port
90 Fourth port
92 First piston
94 Second piston
96 Piston rod
98 Inner wall
100 Vent
102 Pressure sensor
104 Proportional valve
106 2/2-way solenoid valve
108 2/2-way solenoid valve
110 3/2-way solenoid valve
112 2/2-way solenoid valve

What is claimed is:

1. A method for controlling a pneumatic or electropneumatic service brake device of a vehicle including a service brake valve device having a service brake actuation element, the service brake valve device including at least one control piston arranged to directly or indirectly control at least one double-seat valve having an inlet seat and an outlet seat and being arranged to control a pneumatic brake pressure or brake control pressure in at least one pneumatic service brake circuit of the service brake device, the method comprising the acts of:

subjecting the at least one control piston to a first actuation force generated by the service brake actuating element in response to a driver braking demand, wherein a range of the driver braking demand includes no braking demand;

subjecting the at least one control piston to a second actuation force applied to the at least one control piston parallel to an actuation direction of the first actuating force, the second actuation force being generated by an electronic control device independently of the driver braking demand; and generating a pneumatic brake pressure or brake control pressure in the at least one pneumatic service brake circuit of the service brake device in response to actuation of the at least one control piston by the first actuation force and the second actuation force, wherein the second actuation force is applied in the same direction as the first actuation force or in the opposite direction from the first actuation force, the second actuation force is generated directly or indirectly pneumatically by at least one electropneumatic solenoid valve device outputting a control pressure in response to a signal of the electronic control device controlled by the electronic control device, and the control pressure is regulated by the electronic control device.

2. The method as claimed in claim 1, wherein the second actuation force is generated in response to a signal from the electronic control device based on driving operation conditions.

3. The method as claimed in claim 1, wherein the second actuation force is generated in response to a signal from the electronic control device based on a control signal output by a driver assistance system.

4. A method for controlling a pneumatic or electropneumatic service brake device of a vehicle including a service brake valve device having a service brake actuation element, the service brake valve device including at least one control piston arranged to directly or indirectly control at least one double-seat valve having an inlet seat and an outlet seat and being arranged to control a pneumatic brake pressure or brake control pressure in at least one pneumatic service brake circuit of the service brake device, the method comprising the acts of:

subjecting the at least one control piston to a first actuation force generated by the service brake actuating element in response to a driver braking demand, wherein a range of the driver braking demand includes no braking demand;

subjecting the at least one control piston to a second actuation force applied to the at least one control piston parallel to an actuation direction of the first actuating force, the second actuation force being generated by an electronic control device independently of the driver braking demand; and generating a pneumatic brake pressure or brake control pressure in the at least one pneumatic service brake circuit of the service brake device in response to actuation of the at least one control piston by the first actuation force and the second actuation force, measuring as an actual variable at least of the second actuation force acting on the at least one control piston, an actuation travel of the at least one control piston resulting from the second actuation force, and a variable on which the generation of the second actuation force is based;

comparing with the electronic control unit the actual variable to a setpoint variable;

adjusting the signal from the electronic control unit to regulate the second actuation force to align the actual variable with the setpoint variable, wherein the second actuation force is applied in the same direction as the first actuation force or in the opposite direction from the first actuation force.

5. A method for controlling a pneumatic or electropneumatic service brake device of a vehicle including a service brake valve device having a service brake actuation element, the service brake valve device including at least one control piston arranged to directly or indirectly control at least one double-seat valve having an inlet seat and an outlet seat and being arranged to control a pneumatic brake pressure or brake control pressure in at least one pneumatic service brake circuit of the service brake device, the method comprising the acts of:

subjecting the at least one control piston to a first actuation force generated by the service brake actuating element in response to a driver braking demand, wherein a range of the driver braking demand includes no braking demand;

subjecting the at least one control piston to a second actuation force applied to the at least one control piston parallel to an actuation direction of the first actuating force, the second actuation force being generated by an electronic control device independently of the driver braking demand; and generating a pneumatic brake pressure or brake control pressure in the at least one pneumatic service brake circuit of the service brake device in response to actuation of the at least one control piston by the first actuation force and the second actuation force, wherein the second actuation force is applied in the same direction as the first actuation force or in the opposite direction from the first actuation force, and the second actuation force is generated in a manner dependent on at least one of a degree of actuation of the service brake actuation element and on a braking amount of at least one of a permanent brake and a generator brake of the vehicle.

6. The method as claimed in claim 5, wherein the second actuation force increases as the degree of actuation of the service brake actuation element or the braking amount of the permanent brake increases.

7. The method as claimed in claim 1, wherein the service brake valve device generates a brake pressure or a brake control pressure for each service brake circuit based at least in part on the second actuation force, and the brake pressure or brake control pressure for each service brake circuit is controlled on a wheel brake-specific basis by ABS valves arranged in respective brake pressure lines between the service brake valve device and the respective wheel brake connected to each service brake circuit.

8. A service brake valve device for a pneumatic or electropneumatic service brake device of a vehicle, comprising:

a service brake actuation element configured receive a driver braking demand;

at least one control piston actuable by the service brake actuation element in response to the driver braking demand;

at least one double-seat valve configured to be directly or indirectly controlled by the at least one control piston, the at least one double-seat valve including an inlet seat in communication with a compressed air supply port of the service brake device and an outlet seat in communication with a pressure sink;

second actuation force control means configured to receive via an interface at least one signal indicative of driving operating conditions and to control generation of a second actuation force based on the received at least one signal independent of the driver braking demand, the second actuation force being aligned to act on the at least one control piston in parallel to a direction of the first actuation force, with or opposite the first actuation force, and a sensor configured to sense the at least one pneumatic control pressure output by the at least one solenoid valve device and output a measured pressure signal to the electronic control device, wherein actuation of the service brake actuation element in response to the driver braking demand results in generation of a pneumatic brake pressure or brake control pressure in at least one port of a pneumatic service brake circuit in communication with the service brake device, and the electronic control device is configured to receive the measured pressure signal, compare the measured pressure signal to a setpoint value, and adjusting the at least one pneumatic control pressure output by the at least one solenoid valve device to align the measured pressure signal with the setpoint value.

9. The service brake valve device as claimed in claim 8, wherein at least one control chamber of the service brake valve device is delimited by the at least one control piston and by at least one wall of the service brake valve device and is arranged to receive the pneumatic control pressure and impart to the at least one control piston the second actuation force.

10. The service brake valve device as claimed in claim 9, wherein the at least one control chamber includes a first control chamber arranged such that venting of the first control chamber causes the second actuation force to be applied to the at least one control piston in the same direction as the first actuation force, and a second control chamber arranged such that venting of the second control chamber causes the second actuation force to be applied to the at least one control piston in the opposite direction to the first actuation force.

11. The service brake valve device as claimed in claim 10, wherein the first control chamber is arranged to be aerated or vented by way of a first solenoid valve device of the at least one solenoid valve device or by a first control pressure regulator, and the second control chamber is arranged to be aerated or vented independently by a second solenoid valve device of the at least one solenoid valve device or by a second control pressure regulator.

12. The service brake valve device as claimed in claim 11, wherein the at least one control piston is a double piston with two pistons connected by a piston rod, a first piston of the two pistons delimits the first control chamber and a second piston of the two pistons delimits the second control chamber, the first control chamber and the second control chamber adjoin opposite surfaces of an inner wall of the service brake valve device through which the piston rod extends in sealing fashion.

13. The service brake valve device as claimed in claim 8, further comprising:

at least one sensor is arranged to sense at least one of the second actuation force applied to the at least one control piston, an actuation travel of the at least one control piston resulting from application of the second actuation force, and a variable on which generation of the second actuation force is based, wherein the electronic control device is configured to receive a signal indicative of an actual value from the at least one sensor, compare the actual value signal to a setpoint value, and adjust the at least one pneumatic control pressure output by the at least one solenoid valve device to align the actual value signal with the setpoint value.

14. The service brake valve device as claimed in claim 13, wherein the second actuation force control means is configured to generate the second actuation force opposite the direction of the first actuation force based on signals input via the interface indicative of at least one of a degree of actuation and an amount of a braking action of a permanent brake or of a generator brake of the vehicle.

15. A vehicle having a pneumatic or electropneumatic service brake device comprising at least one pneumatic service brake circuit and a service brake valve device as claimed in claim 8.

16. The vehicle as claimed in claim 15, further comprising:

at least one driver assistance system configured to input at least one driver assistance system control signal dependent on driving operation conditions via the interface to the electronic control device, wherein the at least one driver assistance system control signal is considered in the electronic control device determination of the at least one pneumatic control pressure to control generation of the second actuation force.

17. The vehicle as claimed in claim 16, wherein the at least one driver assistance system includes at least one of a drive slip regulation system, an adaptive cruise control system, an emergency braking assistant and a driving dynamics regulation system.

* * * * *